(12) United States Patent
Inoue

(10) Patent No.: US 7,895,609 B2
(45) Date of Patent: Feb. 22, 2011

(54) METHOD FOR INSTALLING DRIVER SOFTWARE, INFORMATION PROCESSING APPARATUS THAT EMPLOYS THE METHOD, COMPUTER PROGRAM FOR PERFORMING THE METHOD, AND STORAGE MEDIUM FOR STORING THE COMPUTER PROGRAM

(75) Inventor: Takashi Inoue, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1188 days.

(21) Appl. No.: 11/257,956

(22) Filed: Oct. 25, 2005

(65) Prior Publication Data

US 2006/0095924 A1 May 4, 2006

(30) Foreign Application Priority Data

Oct. 29, 2004 (JP) .............................. 2004-315851

(51) Int. Cl.
G06F 9/44 (2006.01)
G06F 9/46 (2006.01)
G06F 13/00 (2006.01)
G06F 9/445 (2006.01)

(52) U.S. Cl. ...................... 719/327; 719/321; 717/174

(58) Field of Classification Search ................ 717/174; 719/321, 327; 710/8–14; 358/1.15
See application file for complete search history.

(56) References Cited

U.S. PATENT DOCUMENTS

| 7,082,574 B2 * | 7/2006 | Ogino et al. ................ 715/764 |
| 7,199,890 B2 * | 4/2007 | Kawamoto ................. 358/1.14 |
| 2002/0131067 A1 | 9/2002 | Cox | |
| 2003/0081019 A1 * | 5/2003 | Frolik et al. ................... 347/5 |
| 2004/0057072 A1 * | 3/2004 | Borchers et al. ........... 358/1.15 |
| 2004/0105112 A1 * | 6/2004 | Ishihara et al. ............. 358/1.13 |
| 2004/0105113 A1 | 6/2004 | Ishida et al. | |
| 2004/0249936 A1 * | 12/2004 | Ishida ........................ 709/224 |
| 2005/0044200 A1 * | 2/2005 | Aritomi ...................... 709/223 |
| 2006/0015656 A1 * | 1/2006 | Hayashi ........................ 710/8 |

FOREIGN PATENT DOCUMENTS

| CN | 1472642 C | 2/2004 |
| JP | 07-168682 A | 7/1995 |
| JP | 2001117834 A | 4/2001 |
| JP | 2002149363 A | 5/2002 |
| JP | 2004021400 A | 1/2004 |

OTHER PUBLICATIONS

"Microsoft Computer Dictionary", 2002, Microsoft Press, Fifth Edition, p. 499.*

* cited by examiner

Primary Examiner—Qing Wu
(74) Attorney, Agent, or Firm—Panitch Schwarze Belisario & Nadel LLP

(57) ABSTRACT

An information processing apparatus is directly connected to a local image recording apparatus and connected to network image recording apparatuses through a network. An image recording apparatus searching section searches the local image recording apparatus and the network image recording apparatuses. An image recording apparatus specifying section specifies a desired image recording apparatus from among the local and network image recording apparatuses searched by the image recording apparatus searching section. An information obtaining section obtains information on the desired image recording apparatus, and writes the information on the desired image recording apparatus into driver software. An installing section installs the driver software into the information processing apparatus, the driver software containing the information for the desired image recording apparatus.

19 Claims, 11 Drawing Sheets

DETECTED PRINTERS

| MODEL | REMARK |
|---|---|
| PRINTER A | |
| PRINTER B | |
| PRINTER C | |
| PRINTER D | |

OK  CANCEL

```
[Option]
Duplex=Yes
2ndTray=Installed
[Setting]
Duplex Print=ON
```

```
[FORM DATA]
REQUEST FOR MANAGERIAL DECISION=1, PDL=PS
TRAVEL REQUISITE=2, PDL=PS
```

FIG.8

```
[Option]
Duplex=No
2ndTray=Installed
[Setting]
Duplex Print=OFF
PrinterFontName=MS GOTHIC
PrinterFontSize=10
Size=A4
ReductionRate=100%
```

FIG.9

```
[FORM DATA]
REQUEST FOR MANAGERIAL DECISION=1, PDL=PS
```

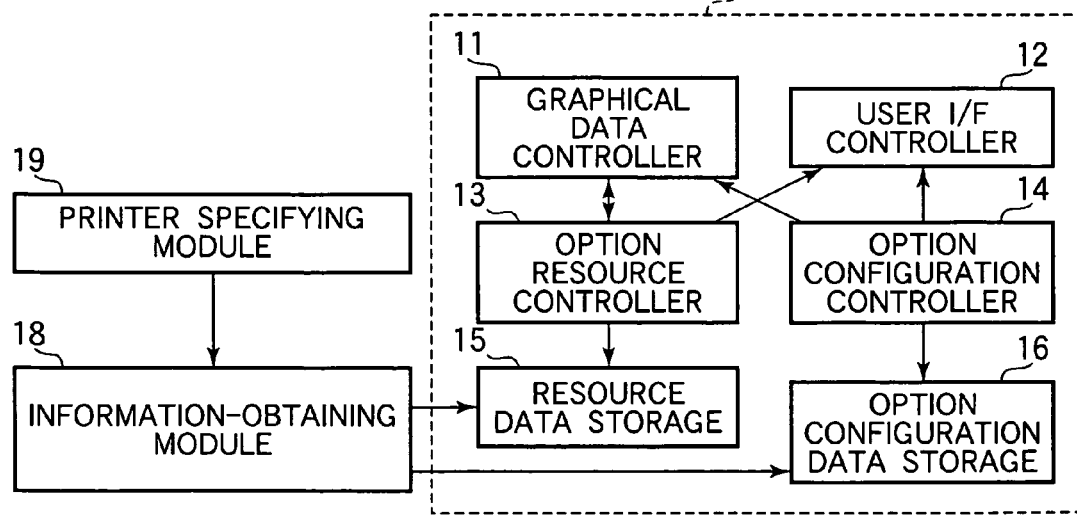

METHOD FOR INSTALLING DRIVER SOFTWARE, INFORMATION PROCESSING APPARATUS THAT EMPLOYS THE METHOD, COMPUTER PROGRAM FOR PERFORMING THE METHOD, AND STORAGE MEDIUM FOR STORING THE COMPUTER PROGRAM

BACKGROUND OF THE INVENTION

1. Field of the Invention

The present invention relates to a method for installing driver software and an information processing apparatus that employs the method.

2. Description of the Related Art

Japanese Patent Laid-Open (Kokai) No. 07-168682 discloses an information processing apparatus connected to a plurality of types of printers through a network. Appropriate driver software must be installed in the printers so that the individual printers can print out the data properly. For this purpose, the information processing apparatus is equipped with a plurality of types of driver software. The information processing apparatus receives information on a printer, and then appropriate software is installed into the printer through the network.

A conventional method for installing driver software is written to select driver software that can run properly on the basic configuration of a printer connected to the network. Thus, the method is unable to properly handle individual settings of optional devices and various resources other than the basic con-figuration.

For this reason, the user must first install the settings of optional devices and various resources other than the basic configurations of printers, and then manually set option configuration information and resource information. Manually setting the driver software often requires frequent manual consultation, taking a lot of time to configure the system properly. This often leads to errors.

SUMMARY OF THE INVENTION

An object of the invention is to provide a method and an information processing apparatus in which information on the configuration of options for a desired printer and information on resources are first obtained and are then written into the driver software, and finally the driver software is installed into the information processing apparatus.

Another object of the invention is to provide a method for installing driver software and an information processing apparatus that uses the method in which once the driver software have been installed, a user does not have to set information on the configuration of options and information on the resources.

An information processing apparatus is connected to at least one local image recording apparatus and connected to at least one network image recording apparatus through a network. The apparatus includes an operating section, an information obtaining section, an information obtaining section, and an installing section. The operating section specifies a desired image recording apparatus from among the at least one local image recording apparatus and the at least one network image recording apparatus. The information obtaining section obtains information on the desired image recording apparatus, and writes the information on the desired image recording apparatus into driver software. The installing section installs the driver software into the information processing apparatus, the driver software containing the information for the desired image recording apparatus.

The information processing apparatus further includes an image recording apparatus searching section that searches the at least one local image recording apparatus and the at least one network image recording apparatus. The image recording apparatus specifying section selects one of the at least one local image recording apparatus and the at least one network image recording apparatus searched by the image recording apparatus searching section.

The image recording apparatus searching section displays the information on the at least one local image recording apparatus and the at least one network image recording apparatus so that the user selectively writes either the information on the at least one local image recording apparatus or the information on the at least one network image recording apparatus into the driver software.

Either when the image recording apparatus searching section fails to detect the one of the plurality of image recording apparatuses, or when the information obtaining section fails to obtain the information, the installing section sets a default setting to the driver software.

The information obtaining section indicates to a user when the information obtaining section fails to obtain the information.

A method is used for installing driver software for an information processing apparatus that is directly connected to at least one local image recording apparatus and is connected to at least one network image recording apparatus through a network. The method including the steps of:

specifying a desired image recording apparatus from among the at least one local image recording apparatus and the at least one network image recording apparatus;

obtaining information on the desired image recording apparatus, and writes the information on the desired image recording apparatus into driver software; and installing the driver software into the information processing apparatus, the driver software containing the information for the desired image recording apparatus.

Specifying a desired image recording apparatus includes searching the at least one local image recording apparatus and the at least one network image recording apparatus before specifying a desired image recording apparatus.

Installing the driver software includes displaying the information so that a user writes the information on the desired image recording apparatus into the driver software.

The method further includes indicating to the user that the information cannot be obtained, if the information on the desired image recording apparatus cannot be obtained.

Installing the driver software comprising writing default information into the driver software, if the searching the at least one local image recording apparatus and the at least one network image recording apparatus fails to detect any image recording apparatus or if the obtaining information on the desired image recording apparatus fails.

A computer program includes an instruction that commands a computer system to execute the aforementioned method.

A storage medium stores the aforementioned computer program and the computer program is read by a computer from the storage medium.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 8 illustrates an example of defaults of the option configuration information;

FIG. 9 illustrates an example of the default of the resource information stored in the printers;

FIG. 11A is an example of an option configuration setting screen illustrating that the duplex printing is ON;

FIG. 11B is an example of an option configuration setting screen illustrating that only a standard tray is attached;

FIG. 12 is a functional block diagram of an installer that installs driver software according to a fourth embodiment;

DETAILED DESCRIPTION OF THE INVENTION

Embodiments of the present invention will be described with reference to the accompanying drawings.

First Embodiment

In a first embodiment, information on the option. configuration of a desired printer (referred to as "option configuration information" hereafter) and information on resources (referred to as "resource information" hereafter) are written into driver software, and then the driver software is installed into an information processing apparatus such as a computer. The option configuration information includes primarily duplex/ simplex printings, option cassettes (second cassette, third cassette etc.) font, and medium size.

Figure 1:
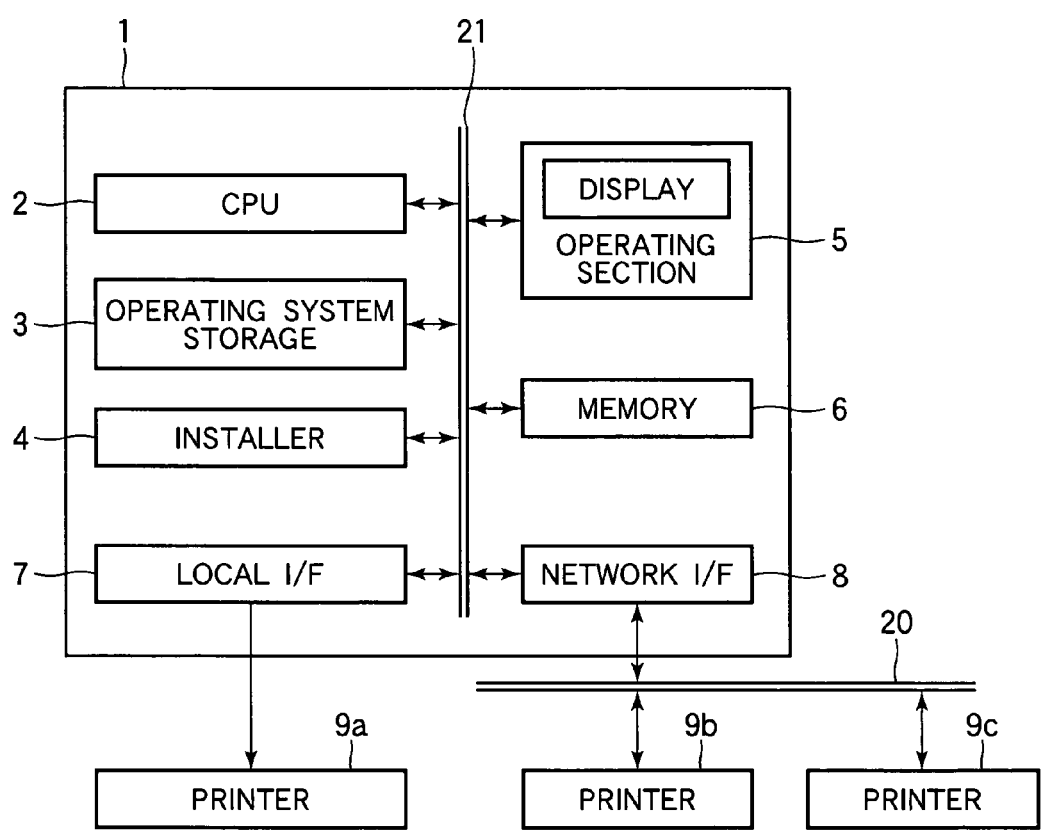
FIG. 1 illustrates the configuration of a driver software-installing system and an information processing apparatus according to a first embodiment.

FIG. 1 illustrates the configuration of a driver software-installing system and an information processing apparatus according to the first embodiment.

The driver software-installing system is configured as follows:

Driver software is installed into an information processing apparatus 1. The information processing apparatus 1 is connected to the printers 9a-9c directly through a local interface (I/F) 7 or through a network 20. The information processing apparatus 1 outputs print data to printers 9a-9c.

The information processing apparatus 1 is configured as follows: A CPU 2 controls the overall operation of the information processing apparatus 1. An operating system (OS) storage 3 stores control programs. An installer 4 installs driver software. An operating section 5 includes a touch panel and an LCD in unitary construction. A memory 6 includes a hard disk driving device and a CD-ROM driving device. A local I/F 7 is in the form of, for example, an IEEE1284 interface through which the information processing apparatus 1 communicates with the printer 9a, which is a local printer. A network I/F 8 establishes a network connection between the information processing apparatus 1 and the printers 9b and 9c, which are remote printers (network printers). The aforementioned respective sections are connected through an internal bus 21.

Figure 2:
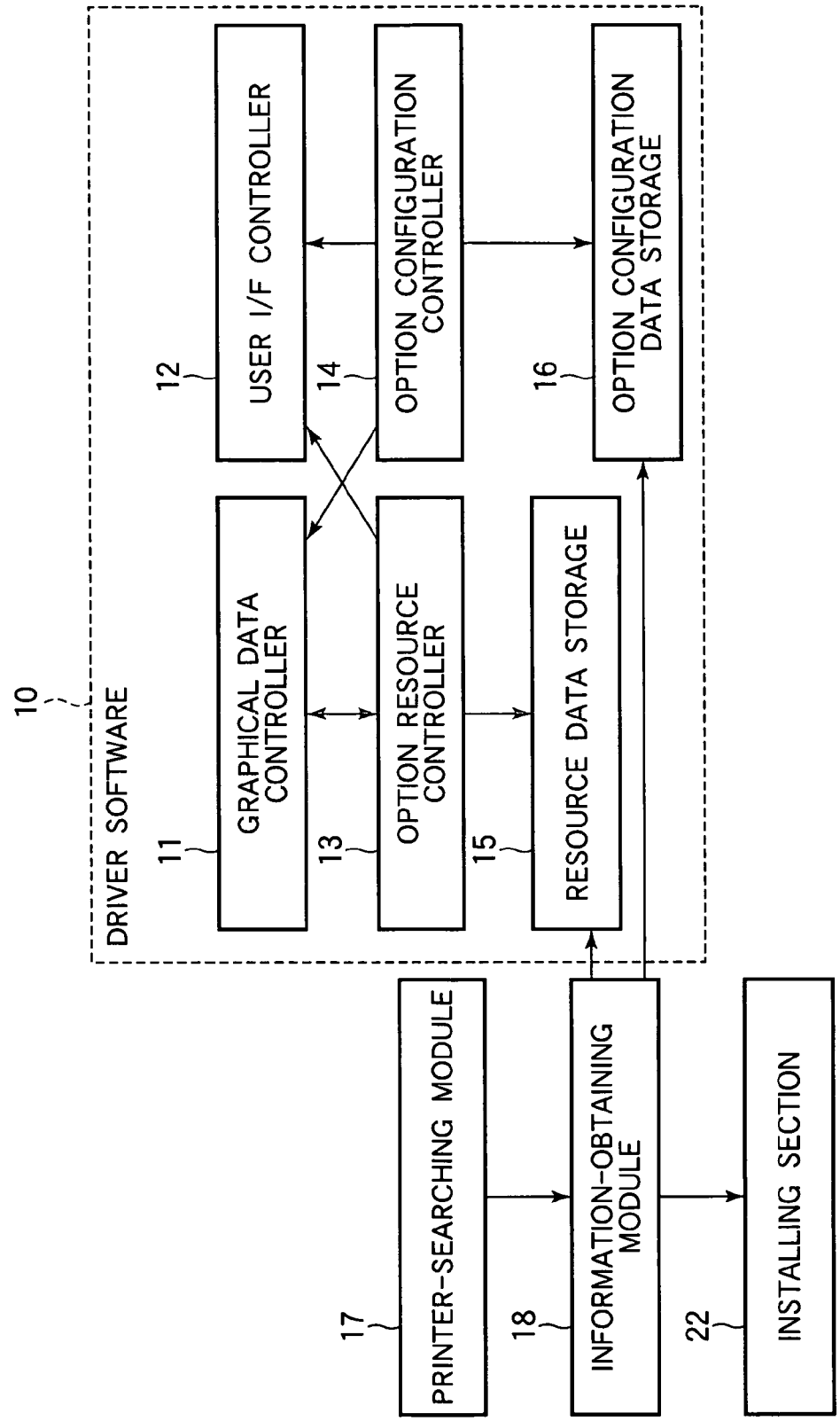
FIG. 2 is a functional block diagram of an installer that installs driver software into the information processing apparatus.

FIG. 2 is a functional block diagram of the installer 4 that installs driver software 10 into the information processing apparatus 1. Referring to FIG. 2, the installer 4 includes driver software 10, a printer-searching module 17, an information-obtaining module 18, and an installing section 22.

The driver software 10 is configured as follows. A graphical print data controller 11 produces data that can be interpreted by the printers 9a-9c upon receiving a graphic instruction from an application. A user I/F controller 12 controls a user interface such as selection of recording paper on which data is printed for performing various printings. A resource data storage 15 stores resource information such as the type of format data and the presence and absence of format data, previously registered in the printers 9a-9b. An option configuration data storage 16 stores resource information on the option configuration obtained from the printers 9. An option resource controller 13 refers the resource data storage 15, and then notifies the user I/F controller 12 and the graphic print data controller 11. An option configuration controller 14 manages the option configuration by referring to an option configuration data storage 16, and then notifies the graphical print data controller 11 and the user I/F controller 12.

Using IEEE1284 protocol, the printer-searching module 17 detects the printer 9a that is connected to the information processing apparatus 1 via the local I/F 7. Using SNMP protocol, the printer-searching module 17 searches devices connected through the network 20 to detect the printers 9b and 9c. Then, the printer-searching module 17 displays the printers 9a-9c on its display unit of the operation section 5.

The information-obtaining module 18 obtains the option configuration information and resource information stored in a desired one of the printer 9a and printers 9b and 9c, and writes the option configuration information and resource information into the driver software 10. The installing section 22 installs into the information processing apparatus 1 the driver software 10 that contains the option configuration information and resource information written into the driver software 10.

{Operation}

Figure 3:
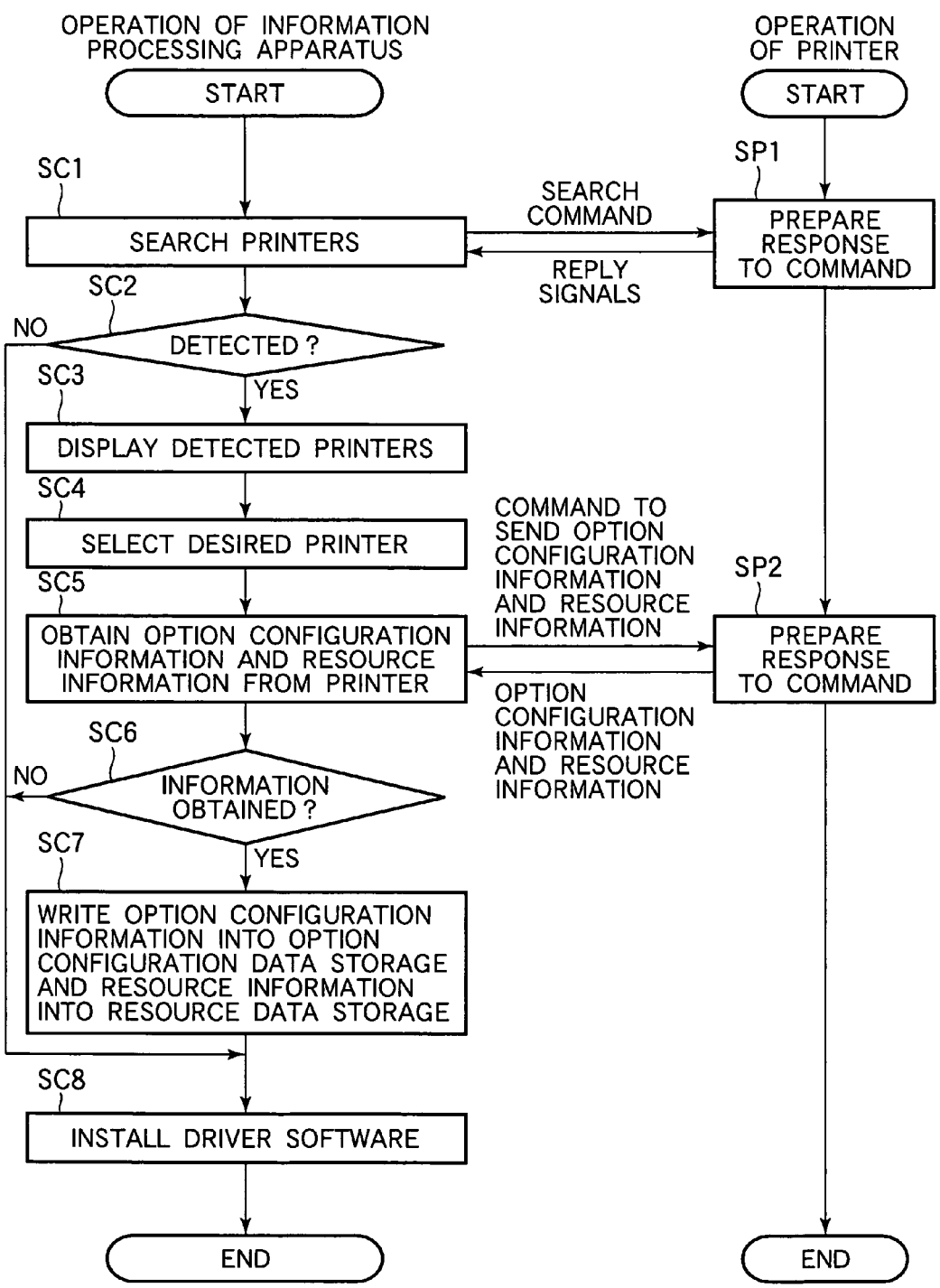
FIG. 3 is a flowchart illustrating the operation of the driver software-installing system according to the first embodiment.

FIG. 3 is a flowchart illustrating the operation of the driver software-installing system according to the first embodiment.

The program for performing the flowchart may be stored in a medium that can be read by a computer. The operation of the driver software-installing system will be described with reference to FIG. 3. For convenience of explanation, steps executed in the information processing apparatus 1 are denoted by "SCx" and the steps executed in the printers 9a-9c are denoted by "SPx." The subscript "x" is an appropriate step number.

{Operation of Information Processing Apparatus}

Referring to FIG. 3, when an install operation is activated by the user, the information processing apparatus 1 transmits a search command to the printer 9a via the local I/F 7 or to the printers 9b and 9c via the network I/F 8 and the network 20, and receives reply signals from the printers 9a-9c, thereby detecting the printers 9a-9c (step SC1). Then, the information processing apparatus 1 extracts from the reply signals the model names and IP addresses corresponding to the detected printers 9a-9c.

There are two types of searches: a "local search" in which the local I/F 7 directly searches the printers 9a using IEEE1284 protocol and a "network search" in which the network I/F 8 searches the printers 9b-9c using SNMP protocol.

If it is determined that no printer is detected (step SC2), the driver software 10 is installed into the information processing apparatus 1 without writing the option configuration information and resource information into the driver software 10 (step SC8) The system may be configured to indicate to the user when no printer is detected. This enables the user to connect printers properly or turn on the printers and then attempt to again install the driver software 10. Thereafter, the user can write the option configuration information and resource information into the driver software 10. Alternatively, the driver software 10 may be installed without checking whether the printer has been connected properly or has been turned on, in which case, the option configuration information and resource information may be written into the drive software 10 after the driver software 10 has been installed.

When printers are detected, the information processing apparatus 1 displays the detected printers on the display unit of the operation section 5 (FIG. 4), prompting the user to select one of the displayed printers (step SC3).

The user is prompted to select one of the printers displayed on the operation panel 5 (step SC3), and therefore selects a desired printer from among the displayed printers (step SC4).

The information processing apparatus 1 communicates with the selected printer by using the IP address of the selected printer to obtain the resource information and the option configuration information from the selected printer (step SC5).

Then, a check is made to determine whether the option configuration information and resource information have been obtained (step SC6). For example, the option configuration information cannot be obtained if the printer has been turned off or the connection of the printer to the information processing apparatus 1 has been interrupted. Thus, the option configuration information and resource information cannot be obtained from the printer (N at step SC6) and therefore the option configuration information cannot be written into the driver software. Therefore, the driver software 10 is installed into the information processing apparatus 1 without the option configuration information and resource information written into the driver software 10 (step SC8).

The information processing apparatus 1 may also be configured such that if the option configuration information cannot be accessed or no printer is detected, the display unit at the operation section 5 will indicate to the user accordingly, and then ask the user as to whether the driver software 10 should be installed without the option configuration information and the resource information written into the driver software 10. Still alternatively, if the printer is equipped with a management apparatus, not shown, the information processing apparatus 1 may be configured such that the information processing apparatus 1 notifies the management apparatus that no printer is detected or that the option configuration information and resource information cannot be obtained. The management apparatus will then indicate to the user that no printer is detected or that the option configuration information and resource information cannot be obtained. The management apparatus will then ask the user as to whether the driver software 10 should be installed without the option configuration information and the resource information written into the driver software.

Prompting the user's decision as described above ensures that the user connects the printer to the information processing apparatus 1 or turns on the printer. Thus, the option configuration information and resource information can be obtained and written into the driver software 10.

If, for example, the option configuration information and resource information has been obtained (Y at step SC6), the information-obtaining module 18 writes the option configuration and the resource information into the option configuration data storage 16 and the resource data storage 15, respectively (step SC7).

The driver software 10, which contains the respective items of information written into the resource data storage 15 and the option configuration data storage 16, is copied into a driver software storage area in the information processing apparatus 1. Then, the necessary data is written into the registry and the initialization file in the information processing apparatus 1 so that the OS of the information processing apparatus 1 can identify the driver software 10. Then, the installing section 22 installs the driver software 10 into the information processing apparatus 1 (step SC8).

Figures 4, 5, 6:
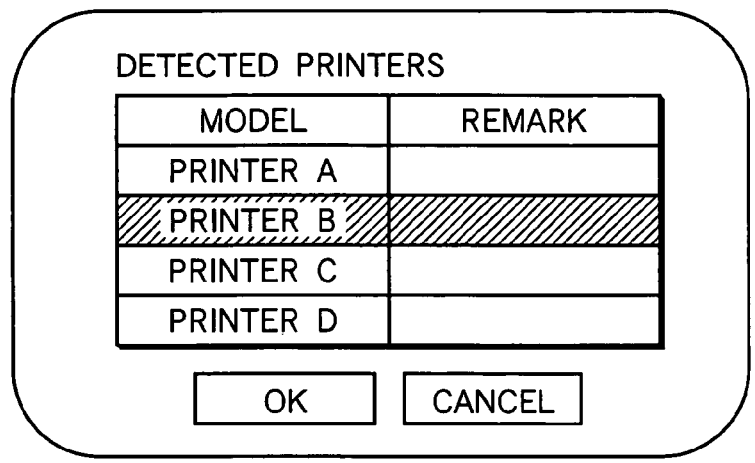
FIG. 4 illustrates four exemplary printers.
FIG. 5 illustrates an example of option configuration information which is written into an option configuration data storage.
FIG. 6 illustrates an example of resource information that is obtained from the printer and is written into a resource data storage.

FIG. 4 illustrates four exemplary printers A to D displayed at step SC3 in FIG. 3. FIG. 4 shows only the model names of the printers connected to the information processing apparatus 1. Instead, IP addresses may be displayed together with the model names of the printers. Still alternatively, instead of displaying all of the detected printers, the operation panel 5 may display only printers on which the driver software 10 can run. In such cases, all of the detected printers should be checked to determine which printers match with the driver software 10, and only matched printers are displayed.

FIG. 5 illustrates an example of option configuration information which is written into the option configuration data storage 16 at step SC5. In this example, "Duplex=Yes" indicates that duplex printing can be performed. "2ndTray=Installed" indicates that a second tray is installed.

"DuplexPrint=ON" below "Setting" indicates that duplex printing has been set ON. Other option configurations include paper size, font, and reduction. Reduction leads to reduction of the number of printed pages and reduction of consumable items.

FIG. 6 illustrates an example of resource information that is obtained from the printer and is written into the resource data storage 15. This example includes "request for managerial decision form" and "travel requisition form," which are form data stored in the printer and used for performing an overlay function in which a previously designed print form is printed in registration with print data from an application program. The page description language (PDL) in which both data forms are written is postscript (PS).

The "request for managerial decision form" is denoted by "1" and the "travel requisition form" is denoted by "2". "PDL=PS" indicates that the page description language (PDL) is postscript.

The installation of the driver software 10 has been described with respect to exclusive driver software that has been stored in the installer 4 previously. Instead, driver software stored in a CD-ROM drive in a memory section 6 or stored in a site on the network 20 may be used as the driver software 10, and the option configuration information and resource information may be written into the thus obtained driver software 10, which can then be stored into the image forming apparatus 1.

The option configuration information and resource information have been described in a source code as shown in FIGS. 5 and 6. Instead, the option configuration information and resource information may be defined in a binary code.

{Operation of Printer}

Referring back to FIG. 3, when the information processing apparatus 1 begins to detect the printer 9a using IEEE1284 protocol and the printer 9b and 9c using SNMP protocol at step SC1, the printers 9a-9c receive a search command in the corresponding protocols. Then, the printers 9a-9c send model names of the printers 9a-9c and IP addresses to the information processing apparatus 1 (step SP1).

When the information processing apparatus 1 sends a command to send the option configuration information and a command to send the resource information to the printer selected at step SC4, the printer extracts the option configuration information and the resource information, and sends these pieces of information to the information processing apparatus 1 (step SP2). This completes the operation of the printers.

As described above, the method for installing the driver software and the image processing apparatus that uses the method allows (1) obtaining of the option configuration information and resource information from the printer selected by the user, (2) writing of these pieces of information into the driver software 10, and (3) installing of the driver software 10 into the information processing apparatus 1. This eliminates the need for setting these pieces of information after installation of the driver software 10, thereby shortening installation time and eliminating errors in settings.

Second Embodiment

A second embodiment has a feature that when an information processing apparatus 1 fails to obtain the option configuration information and the resource information from a printer, these pieces of information may be written at their defaults into driver software 10 and then the driver software 10 is installed into the information processing apparatus 1.

{Configuration}

A driver software-installing system and an information processing apparatus 1 according to the second embodiment have the same configurations as the first embodiment and the description thereof is omitted. An installer 4 according to the second embodiment has the same configuration as that of the first embodiment (FIG. 2) and the description thereof is omitted.

{Operation}

Figure 7:
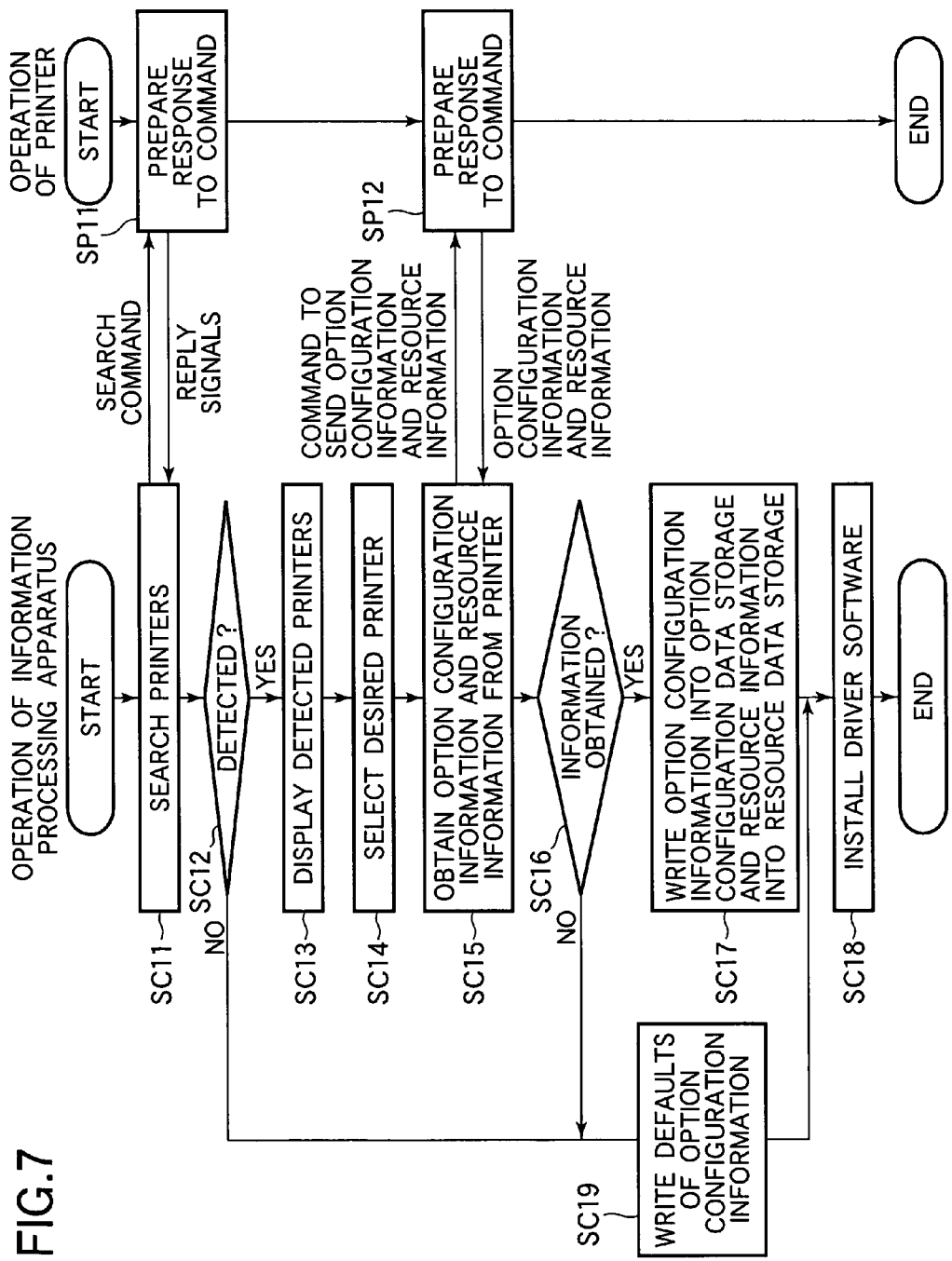
FIG. 7 is a flowchart illustrating the operation of a driver software-installing system according to a second embodiment.

FIG. 7 is a flowchart illustrating the operation of the driver software-installing system according to the second embodiment. The operation of the driver software-installing system will be described with reference to FIG. 7. Steps SC11-SC18 are the same as steps SC1-SP8 of the first embodiment, respectively. Steps SP11 and S12 are the same as steps SP1 and SP2 of the first embodiment, respectively. The detailed description of these steps is omitted for convenience of explanation.

{Operation of Information Processing Apparatus}

Referring to FIG. 7, when an install operation of the driver software 10 is activated by the user, the information processing apparatus 1 transmits a search command to the printer 9a via a local I/F and to the printers 9b and 9c via the network 20, and receives reply signals from the printers 9a-9c, thereby detecting the printers 9a-9c (step SC11). Then, a check is made to determine whether the printers 9a-9c have been detected (step SC12). If YES at step SC12, the information processing apparatus 1 extracts from the reply signals the model names and IP addresses corresponding to the detected printers. The information processing apparatus 1 then stores the model names and IP addresses, and corresponding detected printers. The information processing apparatus 1 also displays the model names and IP addresses on a display of an operation panel 5, thereby prompting the user to select one of the printers (step SC13). When the user selects a desired printer from among the displayed printers, the information processing apparatus 1 communicates with the printer using, for example, the IP address of the selected printer, thereby obtaining the option configuration information and resource information from the printer (step SC15).

Then, a check is made to determine whether the information on the option configuration information and resource information have been obtained (step SC16). If YES, the information-obtaining module 18 writes the option configuration information into the option configuration data storage 16 of the driver software 10 and the resource information into the resource data storage 15 of the driver software 10 (step SC17). The driver software 10 is then copied into a driver software storage area in the image processing apparatus 1. Then, the necessary data is written into the registry and initialization file in the information processing apparatus 1 so that the OS of the information processing apparatus 1 can identify the driver software 10 (step SC18). Then, the installing section 22 installs the driver software 10 into the information processing apparatus 1.

If it is determined that no printer is detected (N at step SC12) or the option configuration information and resource information cannot be obtained (N at step SC16), the driver software 10 is installed into the information processing apparatus 1 with predetermined option configuration information and resource information at their defaults written into the option configuration data storage 16 (step SC19).

Instead of writing the defaults, the information processing apparatus 1 may be configured such that the display unit at the operation panel 5 indicates to the user that the option configuration information cannot be accessed and therefore their defaults will be written into the driver software 10, thereby prompting the user to check whether the printers have been connected properly or have been turned on. Subsequently, the information processing apparatus 1 obtains the option configuration information from the detected printer and then reinstalls the driver software 10. Alternatively, the driver software 10 may be installed without checking whether the printer has been connected properly or has been turned on, in which case, only the option configuration information may be written after the driver software 10 has been installed.

The default that is written at step SC19 is in the same format as that in FIG. 5.

FIG. 8 illustrates an example of the defaults of the option configuration information. Referring to FIG. 8, if the printer is not equipped with a function of duplex printing, the default is "Duplex=No." If the printer is equipped with a second tray, the default is "2ndTray=Installed".

"DuplexPrint=OFF" below "Setting" indicates that duplex printing has been set OFF. Other settings include "PrintFontName=MS Gothic" for font, "PrintFontSize=10" for font size, "Size=A4" for paper size, and "ReductionRate=100%" for reduced printing. These settings are written into the option configuration data storage 16 of the driver software 10.

As described above, because the second tray is described as a default, when the second tray is to be used, it is only necessary to alter the setting.

FIG. 9 illustrates an example of the default of the resource information stored in the printers 9a-9c. In this example, the resource information is form data of a request for managerial decision form written in postscript. The request for managerial decision form may be assigned an identification number "1" and "PDL=PS." "PDL=PS" indicates that the page description language (PDL) is postscript (PS).

{Operation of Printer}

When the information processing apparatus 1 begins to search the printer 9a using IEEE1284 protocol and the printers 9b and 9c using SNMP protocol, the printer 9a receives a search command in IEEE1284 protocol and the printers 9b and 9c receive a search command in SNMP protocol. Then, the printers 9a-9c send model names of the printers 9a-9c and IP addresses to the information processing apparatus 1 (step SP11).

When the information processing apparatus 1 sends to the printer selected at step SC4 a command to send the option configuration information and a command to send the resource information (step SC15), the selected printer sends these pieces of information to the information processing apparatus 1 (SP12) This completes the operation of the printer.

As described above, with the method and apparatus according to the second embodiment, it is possible to write default settings of the option configuration information and resource information into the driver software 10 before installing the driver software 10 into the information processing apparatus 1. Thus, in addition to the advantages of the first embodiment, the second embodiment has an advantage that the defaults of option configuration information and resource information can be used.

Third Embodiment

In a third embodiment, option configuration information and resource information are displayed so that the user can set the respective items of information selectively.

{Configuration}

A driver software-installing system and an information processing apparatus according to the third embodiment have the same configurations as the first embodiment and the description thereof is omitted. An installer 4 according to the third embodiment has the same configuration as that of the first embodiment (FIG. 2) and the description thereof is omitted.

{Operation}

Figure 10:
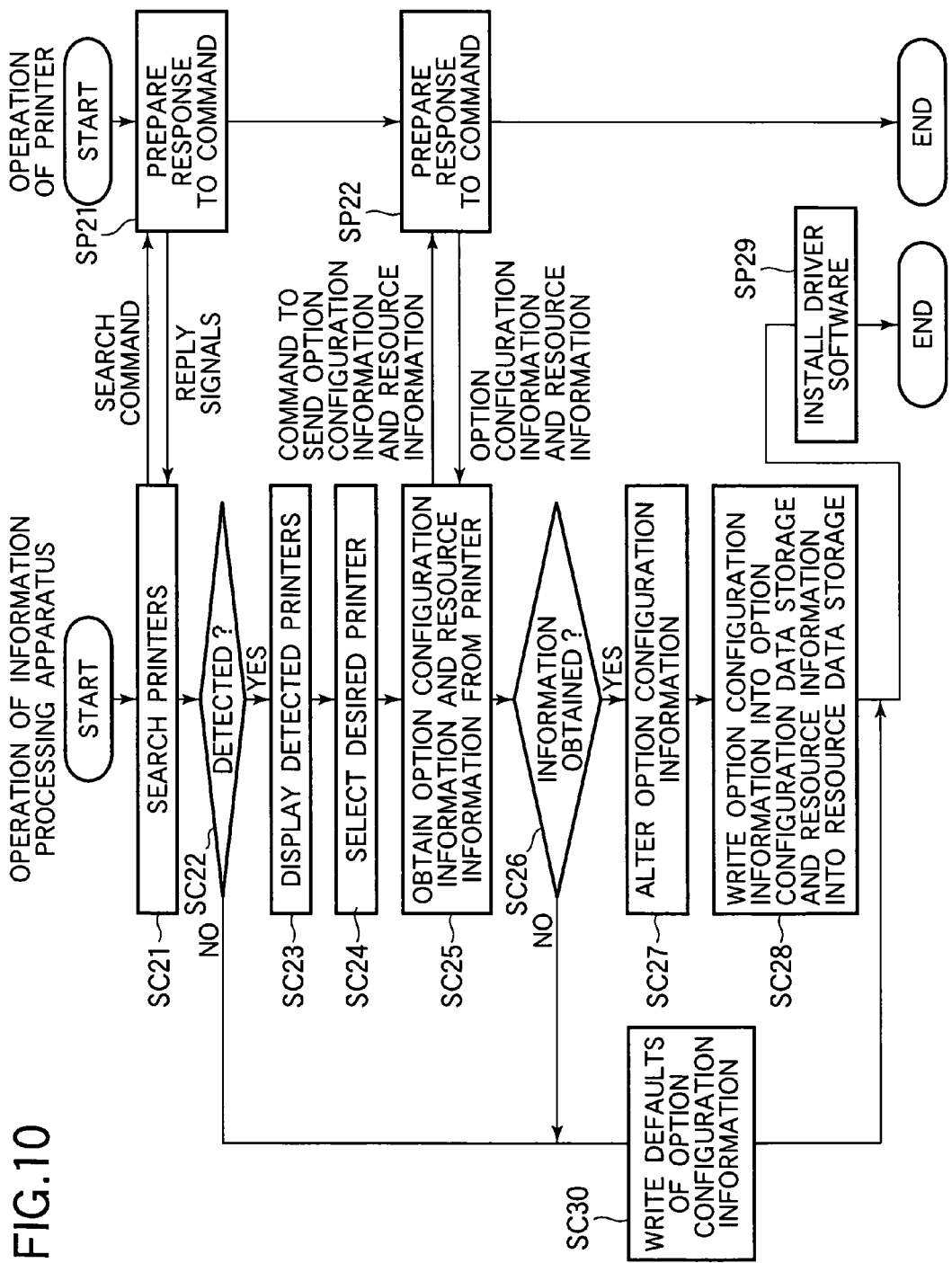
FIG. 10 is a flowchart illustrating the operation of a driver software-installing system according to a third embodiment.

FIG. 10 is a flowchart illustrating the operation of the driver software-installing system according to the third embodiment. The operation of the driver software-installing system will be described with reference to FIG. 10. Steps SC21-SC26 and SC28-SC30 in FIG. 10 are the same as steps SC11-SP19 of the second embodiment, respectively. Steps SP21 and S22 are the same as steps SP11 and SP12 of the second embodiment, respectively. The detailed description of these steps is omitted for convenience of explanation.

{Operation of Information Processing Apparatus}

Referring to FIG. 10, when the user activates an install operation of the driver software 10, the information processing apparatus 1 searches the printers 9a-9c connected to the information processing apparatus 1 by using IEEE 1284 protocol and SNMP protocol, and stores the model names and IP addresses and corresponding printers 9a-9c (step SC21). Then, a check is made to determine whether printers 9a-9c have been detected (step SC22) If YES, at step SC22, the information processing apparatus 1 displays the detected printers on a display unit of an operation section 5 to prompt the user to select a desired printer from among the displayed printers (step SC23). When the user selects a desired printer from the displayed printers (step SC24), the information processing apparatus 1 communicates with the selected printer by using, for example, an IP address, so that the information processing apparatus 1 obtains, for example, the option configuration information and resource information from the printer (step SC25).

Then, a check is made to determine whether the option configuration information and resource information have been obtained (SC26). If the option configuration information and resource information have been obtained (Y at step SC26), the information processing apparatus 1 displays the option configuration information on a display as shown in FIGS. 11A and 11B. The settings of the selected option configuration are shown below the obtained option configuration information.

Referring to FIG. 11A and FIG. 11B, the option configuration of the printer is such that the printer is equipped with a single tray and duplex printing but is not equipped with a finisher that performs stapling and punching and an extension disk such as a hard disk.

FIG. 11A is an example of an option configuration setting screen illustrating that the duplex printing is ON. FIG. 11B is an example of an option configuration setting screen illustrating that only a standard tray is attached.

If the duplex printing is not to be used, then the user selects a function of "duplex printing" in FIG. 11A, then selects "NOT-TO-BE-USED," and finally clicks on an "OK" button. If a second tray is to be attached, then the user selects "the number of trays," then selects "2 (standard, 2nd)" in FIG. 11B, and finally clicks on the "OK" button. This completes the alteration of the option configuration information (step SC27).

The resource information may also be displayed in much the same way as the option configuration information so that the user can modify the resource information as required.

The option configuration information and resource information that have been set by the user are written into the option configuration data storage 16 and the resource data storage 15, respectively (step SC28). Then, the driver software 10 is copied into a driver software storage area in the information processing apparatus 1. Then, the necessary data is written into the registry and initialization file in the information processing apparatus 1 so that the OS of the information processing apparatus 1 can identify the driver software 10 (step SC29). Then, the installing section 22 installs the driver software 10 into the information processing apparatus 1.

If it is determined that no printer is detected (N at step SC22) or the option configuration information and resource information cannot be obtained (steps SC26), the driver software 10 is installed into the information processing apparatus 1 with the default settings of option configuration information and resource information written into the option configuration data storage 16 and the resource data storage 15, respectively (step SC30).

Instead of writing the defaults, the information processing apparatus 1 may be configured such that the display unit at the operation section 5 indicates to the user that the option configuration information and resource information cannot be accessed and therefore the defaults will be written into the driver software 10, thereby prompting the user to check whether the printers have been connected properly or have been turned on. Subsequently, the information processing apparatus 1 obtains the option configuration information on the detected printer and then reinstalls the driver software 10. Alternatively, the driver software 10 may be rewritten without checking whether the printer has been connected properly or has been turned on, in which case, only the option configuration information is written after the driver software 10 has been installed.

{Operation of Printer}

When the information processing apparatus 1 begins to detect the printer 9a using IEEE1284 protocol and the printers 9b and 9c using SNMP protocol, the printer 9a receives a search command in IEEE1284 protocol and printers 9b and 9c receive a command in SNMP protocol. Then, the printers 9a-9c send their model names and IP addresses to the information processing apparatus 1 (step SP21).

When the information processing apparatus 1 sends at step SC25 a command to send the option configuration information and a command to send the resource information to the printer selected at step SC24, the printer sends these pieces of information to the information processing apparatus 1 (SP22). This completes the operation of the printer.

As described above, the method and apparatus according to the third embodiment is configured such that the option configuration information and the resource information obtained from a desired printer are displayed for the user to set and modify these items of information independently. The third embodiment provides the following additional advantages as well as the same advantages as the first and second embodiments. The third embodiment allows the user to obtain and modify the option configuration information and resource information as required, thereby eliminating the need for setting after installing the driver software.

Fourth Embodiment

In a fourth embodiment, printers are not searched but a user directly specifies a desired printer by using, for example, the IP address for the desired printer. The user obtains option configuration information and resource information from the specified printer, writes these pieces of information into driver software, and then installs the driver software into an information processing apparatus 1.

{Configuration}

FIG. 12 is a functional block diagram of an installer 4 that installs driver software 10. A driver software-installing system and an information processing apparatus according to the fourth embodiment have the same configurations (FIG. 1) as the first embodiment and the description thereof is omitted. The installer 4 according to the fourth embodiment has the same configuration as that of the first embodiment (FIG. 2) except that a printer specifying module 19 is used in place of the printer searching module 17.

The user can input information such as a network address, which specifies a desired printer, into a printer specifying module 19. The rest of the configuration of the installer 4 is the same as that of the first embodiment, and the description thereof is omitted.

{Operation}

Figure 13:
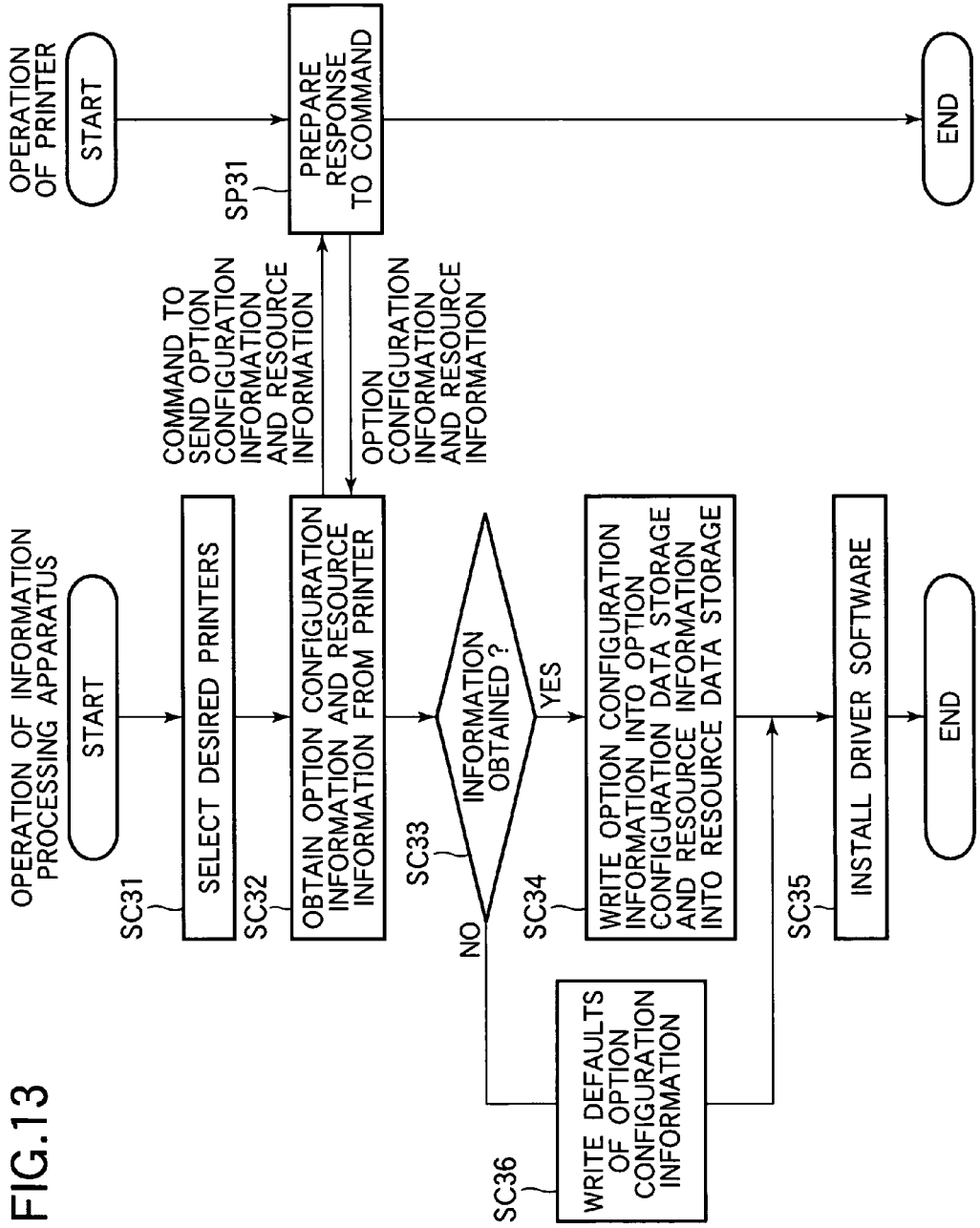
FIG. 13 is a flowchart illustrating the operation of a driver software-installing system according to the fourth embodiment.

FIG. 13 is a flowchart illustrating the operation of the driver software-installing system according to the fourth embodiment. The operation of the driver software-installing system will be described with reference to FIG. 13. Steps SC32-SC36 in FIG. 13 are the same as steps SC15-SP19 of the second embodiment, respectively. Step SP31 is the same as step SP12 of the second embodiment, respectively. The detailed description of these steps is omitted for convenience of explanation.

{Operation of Information Processing Apparatus}

Figure 14:
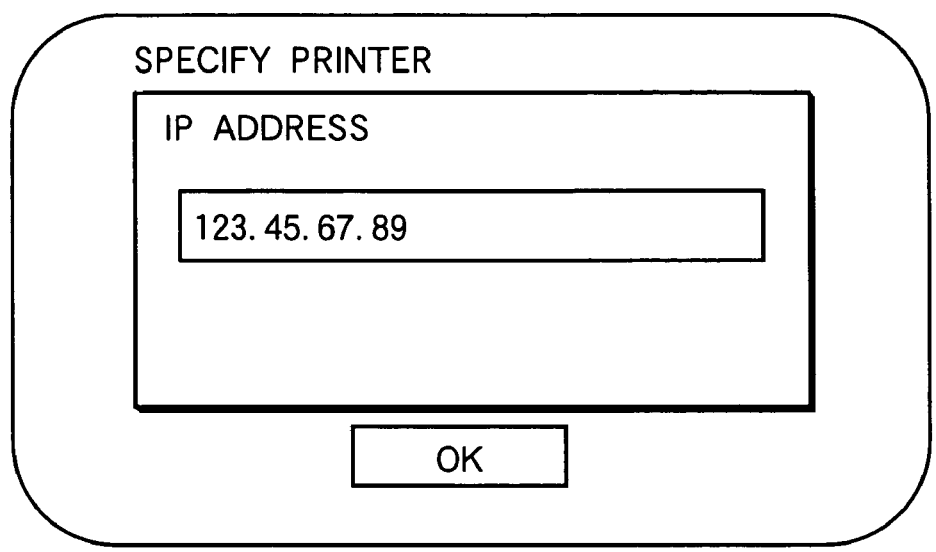
FIG. 14 illustrates an example of a printer specifying screen.

Referring to FIG. 13, when the install of the driver software is initiated, the information processing apparatus 1 displays a printer-specifying screen (FIG. 14) so that the user can specify a desired printer.

The user inputs the previously obtained IP address of a desired printer, for example, "123.45.67.89" and then clicks on an "OK" button (step SC31). The "123.45.67.89" is an arbitrary example and does not refer to any specific, particular section in the present invention.

The information processing apparatus 1 communicates with the printer specified by the IP address, and obtains the option configuration information and resource information from the printer (step SC32).

A check is made to determine whether the option configuration information and resource information have been obtained (step SC33) If YES, then the information-obtaining module 18 writes the option configuration information and resource information into the resource data storage 15 and the option configuration data storage 16, respectively (step SC34). The driver software 10 is then copied into a driver software storage area in the information processing apparatus 1. Then, the necessary data is written into the registry and initialization file in the information processing apparatus 1 so that the OS of the information processing apparatus 1 can identify the driver software 10. Then, the installing section 22 installs the driver software 10 into the information processing apparatus 1 (steps SC35).

If it is determined that the option configuration information and resource information cannot be obtained (step SC33), the driver software 10 is installed into the information processing apparatus 1 with predetermined default settings of the option configuration information and resource information written into the option configuration data storage 16 and the resource data storage 15, respectively (step S36).

The information processing apparatus 1 may also be configured as follows: The information processing apparatus 1 indicates to the user that the predetermined default settings of the option configuration information and resource information will be written. The information processing apparatus 1 then prompts the user to check whether the selected printer has been connected properly or has been turned on. Then, the information processing apparatus 1 obtains the option configuration information and resource information from the selected printer and install the driver software 10. Alternatively, the driver software 10 may be installed without checking whether the printer has been connected properly or has been turned on, in which case, only the option configuration information and resource information may be written after the driver software 10 has been installed.

The fourth embodiment allows the user to directly specify a desired printer. In this case, too, the user may also modify the settings of option configuration information and then write the modified option configuration information into the driver software 10.

{Operation of Printer}

The information processing apparatus 1 sends a command to send the option configuration information and the resource information, and the printer at the IP address specified at step SC31 receives the command. The printer then sends the option configuration information and the resource information to the information processing apparatus 1 (step SP31). This completes the install operation of the driver software 10.

As described above, with the method and apparatus according to the fourth embodiment, prior to installing the driver software 10, the user can input the address of a desired printer to specify the desired printer. This ensures that the user specifies a desired printer to obtain the option configuration information and the resource information from the desired printer and the information-obtaining module 18 writes these pieces of information into the driver software 10 before installing. Thus, it is not necessary to set these pieces of information after having installed the driver software 10.

Fifth Embodiment

In a fifth embodiment, an information processing apparatus 1 provides a warning when option configuration information and resource information cannot be obtained from searched printers or a specified printer, so that a user can interrupt the install of the driver software.

{Configuration}

A driver software-installing system and an information processing apparatus according to the fifth embodiment have the same configurations as the fourth embodiment and the description thereof is omitted. An installer 4 according to the fifth embodiment has the same configuration as that of the fourth embodiment (FIG. 12) and the description thereof is omitted.

{Operation}

Figure 15:
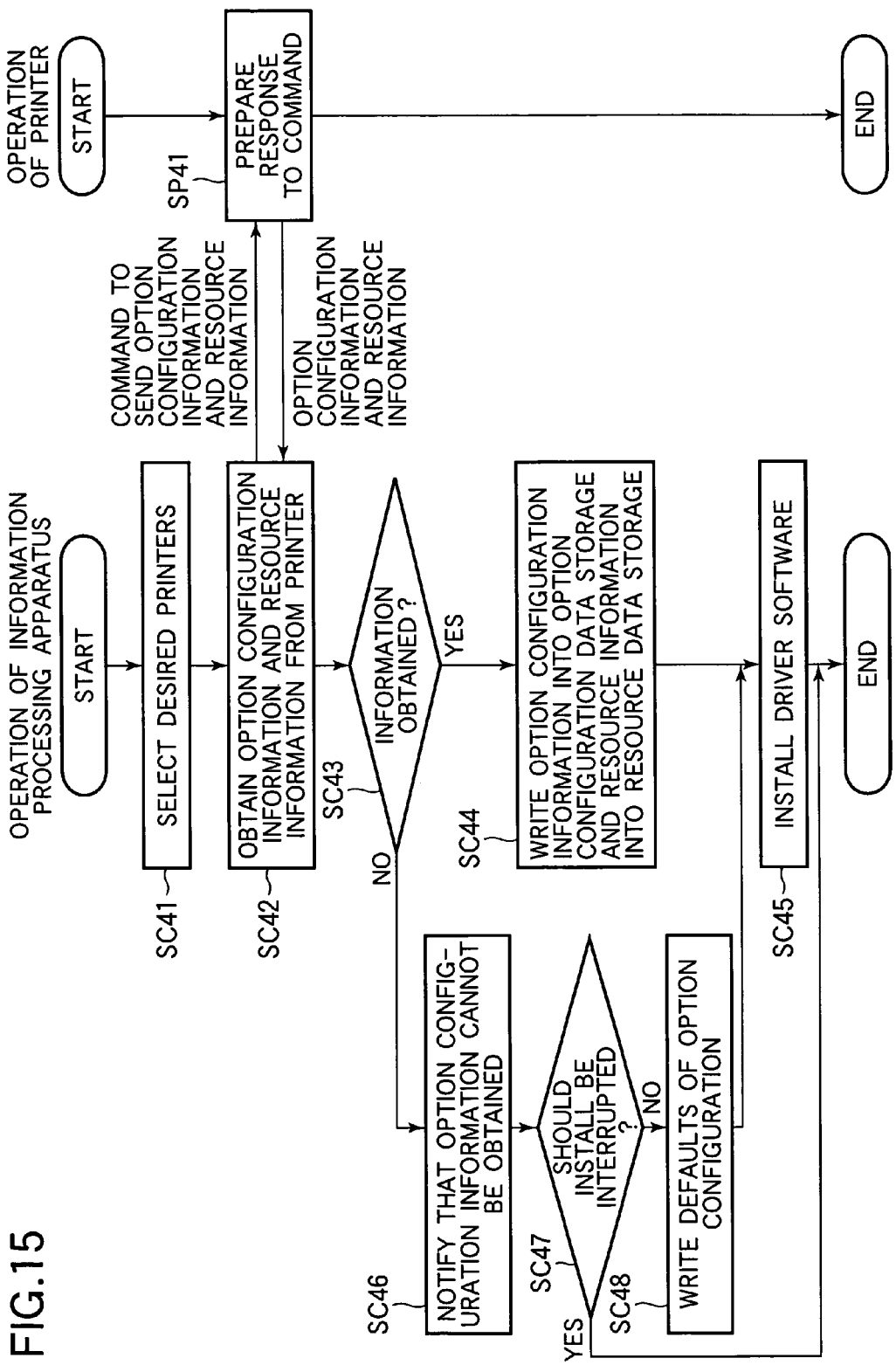
FIG. 15 is a flowchart illustrating the operation of a driver software-installing system according to a fifth embodiment.

FIG. 15 is a flowchart illustrating the operation of the driver software-installing system according to the fifth embodiment. The operation of the driver software-installing system will be described with reference to FIG. 15. Steps SC41-SC45 and SC48 in FIG. 15 are the same as steps SC31-SP35 and SC36 of the fourth embodiment, respectively. Step SP41 is the same as step SP31 of the fourth embodiment. The detailed description of these steps is omitted for convenience of explanation.

{Operation of Information Processing Apparatus}

Referring to FIG. 15, when the install of the driver software is initiated, the information processing apparatus 1 displays a printer-specifying screen (FIG. 14) through which a user can specify a desired printer (step SC41). The user inputs the IP address of the desired printer, which has been obtained previously, and then clicks on an "OK" button, so that the information processing apparatus 1 communicates with the printer at the IP address to obtain the option configuration information from the printer (step SC42).

A check is made to determine whether the option configuration information and resource information have been obtained (step SC43) If YES at step SC43, then information-obtaining module 18 writes the option configuration information and resource information into the resource data storage 15 and the option configuration data storage 16 (step SC44). The driver software 10 is then copied into a driver software storage area in the information processing apparatus 1. Then, the necessary data is written into the registry and initialization file in the information processing apparatus 1 so that the OS of the information processing apparatus 1 can identify the driver software 10 (steps SC45). Then, the installing section 22 installs the driver software 10 into the information processing apparatus 1 (steps SC45).

Figure 16:
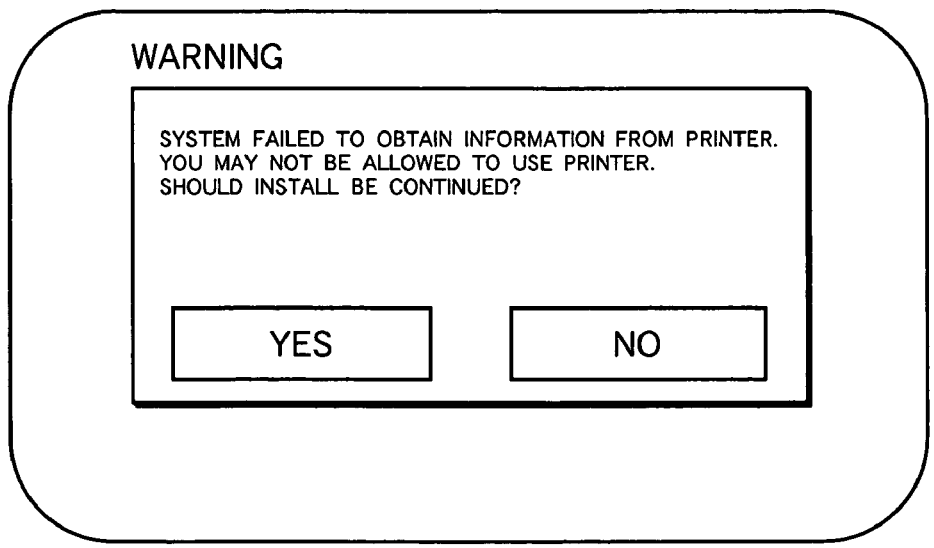
FIG. 16 illustrates an example of a warning.

If it is determined that the option configuration information and resource information cannot be obtained (N at step SC43), the information processing apparatus 1 indicates to the user that the option configuration information and resource information cannot be obtained (step SC46). This may be accomplished by showing a warning screen in FIG. 16, by emitting voice guidance, or by the combination of the warning screen and the voice guidance.

Then, the user investigates the status of the specified printer and makes a decision to determine whether the install of the driver software 10 should be interrupted (step SC47). The user clicks on a "YES" button if the install of the driver software 10 should be interrupted and a "NO" button if the install of the driver software 10 should not be interrupted.

If the "YES" button is clicked, the program ends. If the "NO" button is clicked, the option configuration and resource information are written at their defaults into the option configuration data storage 16 and the resource data storage 15, respectively, just as at step SC36 of the fourth embodiment (step SC48).

Then, the thus prepared driver software 10 is then copied into the driver software storage area in the information processing apparatus 1. Then, the necessary data is written into the registry and initialization file in the information processing apparatus 1 so that the OS of the information processing apparatus 1 can identify the driver software 10, and then the driver software 10 is installed (step SC45). This completes the operation for installing the driver software 10.

The fifth embodiment allows the user to directly specify a desired printer. In this case, too, the user may modify the settings of the option configuration information and resource information just as in the third embodiment (SC27 in FIG. 10), and then write the option configuration information and resource information into the driver software 10.

{Operation of Printer}

The information processing apparatus 1 outputs a command to send the option configuration information and the resource information, and the printer at the IP address, specified at step SC41, receives the command. The printer then sends the option configuration information and the resource information to the information processing apparatus 1 (step SP41). This completes the install operation.

As described above, the method and information processing apparatus according to the fifth embodiment provides a warning when the option configuration information and resource information cannot be obtained from a directly specified printer or searched printers, so that a user can interrupt the install of the driver software at will.

The present invention is applicable to methods for installing driver software where driver software is installed into a printer having an option configuration. The invention is also applicable to an information processing apparatus, a system and service that use a method for installing driver software.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An information processing apparatus that is connected to at least one local image recording apparatus and connected to at least one network image recording apparatus through a network, the information processing apparatus comprising:
   an operating section through which a user specifies a desired image recording apparatus from among the at least one local image recording apparatus and the at least one network image recording apparatus and a plurality of user-selected options of the desired image recording apparatus;
   an information obtaining section that obtains information on availability of options of the desired image recording apparatus, and writes the information on the availability of options of the desired image recording apparatus and information on the plurality of the user-selected options of the desired image recording apparatus into driver software, wherein the information obtaining section allows the user to alter a setting of at least one of the user-selected options and writes the altered setting into the driver software; and
   an installing section that installs the driver software into the information processing apparatus, the driver software containing the information on the availability of options of the desired image recording apparatus and the information on the plurality of user-selected options of the desired image recording apparatus.

2. The information processing apparatus according to claim 1, further comprising an image recording apparatus searching section that searches the at least one local image recording apparatus and the at least one network image recording apparatus;
   wherein the user selects, through said operating section, one of the at least one local image recording apparatus and the at least one network image recording apparatus searched by said image recording apparatus searching section.

3. The information processing apparatus according to claim 2, wherein said image recording apparatus searching section displays the information on the availability of options of the at least one local image recording apparatus and the information on the availability of options of the at least one network image recording apparatus so that the user selectively writes into the driver software either the information on whether the options of the at least one local image recording apparatus should be used or the information on whether the options of the at least one network image recording apparatus into the driver software should be used.

4. The information processing apparatus according to claim 2, wherein either when said image recording apparatus searching section fails to detect the at least one local image recording apparatus and the at least one network image recording apparatus or when said information obtaining section fails to obtain the information on the availability of options of the at least one local image recording apparatus and the information on the availability of options of the at least one network image recording apparatus, said installing section sets a default setting to the driver software.

5. The information processing apparatus according to claim 1, wherein said information obtaining section indicates to the user when said information obtaining section fails to obtain the information on the availability of options of the at least one local image recording apparatus and the information on the availability of options of the at least one network image recording apparatus.

6. The information processing apparatus according to claim 1, wherein the information on the availability of options of the desired image recording apparatus and the information on the plurality of user-selected options are written into the driver software before the driver has been installed into the information processing apparatus.

7. The information processing apparatus according to claim 6, wherein the options include at least one of duplex printing, additional tray, font, medium size, and reduction of the number of printed pages.

8. The information processing apparatus according to claim 6, wherein resource information is written into the driver software before the driver is installed into the information processing apparatus.

9. The information processing apparatus according to claim 8, wherein the resource information includes at least one of form data and page description language.

10. A method for installing driver software for an information processing apparatus that is directly connected to at least one local image recording apparatus and is connected to at least one network image recording apparatus through a network, the method including the steps of:
    specifying a desired image recording apparatus from among the at least one local image recording apparatus and the at least one network image recording apparatus and the plurality of user-selected options of the desired image recording apparatus;
    obtaining information on availability of options of the desired image recording apparatus,
    writing the information on the availability of options of the desired image recording apparatus and information on the plurality of user-selected options of the desired image recording apparatus into driver software;
    allowing the user to alter a setting of at least one of the user-selected options and writing the altered setting into the driver software; and
    installing the driver software into the information processing apparatus, the driver software containing the information on the availability of options of the desired image recording apparatus and information on the plurality of user-selected options of the desired image recording apparatus.

11. The method according to claim 10, wherein specifying a desired image recording apparatus comprises searching the at least one local image recording apparatus and the at least one network image recording apparatus before specifying a desired image recording apparatus.

12. The method according to claim 10, wherein installing the driver software comprises displaying the information on the availability of options of the desired image recording apparatus so that a user writes into the driver software the information on whether the options should be used.

13. The method according to claim 10, further comprising indicating to the user that the information on the availability of options of the desired image recording apparatus cannot be obtained, if the information on the availability of options of the desired image recording apparatus cannot be obtained.

14. The method according to claim 13, wherein installing the driver software comprises writing default information into the driver software, if the searching the at least one local image recording apparatus and the at least one network image recording apparatus fails to detect any image recording apparatus or if the obtaining information on the availability of options of the desired image recording apparatus fails.

15. A storage medium that stores a computer program with an instruction that commands a computer system to execute the method according to claim 10, wherein the computer program is read by a computer from the storage medium.

16. The method according to claim 10, wherein the information on the availability of options of the desired image recording apparatus and information on the plurality of user-selected options are written into the driver software before the driver is installed into the information processing apparatus.

17. The method according to claim 16, wherein the options include at least one of duplex printing, additional tray, font, medium size, and reduction of the number of printed pages.

18. The method according to claim 16, wherein resource information is written into the driver software before the driver is installed into the information processing apparatus.

19. The method according to claim 18, wherein the resource information includes at least one of form data and page description language.

* * * * *